United States Patent
Chiricescu et al.

(10) Patent No.: US 10,152,330 B2
(45) Date of Patent: Dec. 11, 2018

(54) MEMORY PROTECTION USING A TAGGED ARCHITECTURE

(71) Applicant: BAE SYSTEMS INFORMATION AND ELECTRONIC SYSTEMS INTEGRATION INC., Nashua, NH (US)

(72) Inventors: Silviu S. Chiricescu, Arlington, MA (US); Howard B. Reubenstein, Bedford, MA (US); Arun Thomas, Somerville, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 23 days.

(21) Appl. No.: 15/268,738

(22) Filed: Sep. 19, 2016

(65) Prior Publication Data
US 2017/0083255 A1  Mar. 23, 2017

Related U.S. Application Data

(60) Provisional application No. 62/221,287, filed on Sep. 21, 2015.

(51) Int. Cl.
G06F 12/00 (2006.01)
G06F 13/00 (2006.01)
G06F 13/28 (2006.01)
G06F 9/44 (2018.01)

(52) U.S. Cl.
CPC ........................... G06F 9/44 (2013.01)

(58) Field of Classification Search
CPC ...... G06F 3/0622; G06F 3/0637; G06F 3/064; G06F 3/0673

USPC ........................................................ 711/164
See application file for complete search history.

(56) References Cited

U.S. PATENT DOCUMENTS

| 8,452,931 | B1 * | 5/2013 | Rokade | G06F 11/2094 711/112 |
| 8,782,625 | B2 * | 7/2014 | Godefroid | G06F 11/3624 717/126 |
| 9,405,515 | B1 * | 8/2016 | Bertram | G06F 8/41 |
| 2009/0172778 | A1 * | 7/2009 | Stephens | G06F 21/22 726/2 |
| 2010/0269102 | A1 * | 10/2010 | Latorre | G06F 12/08 717/30 |
| 2011/0314251 | A1 * | 12/2011 | Godefroid | G06F 11/3604 711/217 |
| 2012/0233584 | A1 |  9/2012 | Ivancic et al. |  |

(Continued)

OTHER PUBLICATIONS

Dhawan et al., "Architectural Support for Software-Defined Metadata Processing", Article, Mar. 2015, 17 Pages, Publication rights licensed to ACM.

(Continued)

Primary Examiner — Mohamed Gebril
(74) Attorney, Agent, or Firm — Davis & Bujold, PLLC

(57) ABSTRACT

The system and method of memory protection using a tagged architecture. The system of memory protection provides a unique tag for each field, within a structure, thus preventing access beyond the structure. The system compares the unique tag, e.g. color, of each field within the structure to the color of the pointer that is used to access the respective structure field. Freed memory is tagged as uninitialized.

10 Claims, 2 Drawing Sheets

(56) References Cited

U.S. PATENT DOCUMENTS

| | | | |
|---|---|---|---|
| 2013/0226887 A1* | 8/2013 | Braam | H04L 67/1097 707/697 |
| 2014/0214998 A1* | 7/2014 | Lentini | H04L 47/70 709/212 |
| 2014/0229951 A1* | 8/2014 | Zhang | G06F 9/445 718/100 |
| 2014/0289191 A1* | 9/2014 | Chan | G06F 9/54 707/610 |
| 2015/0058291 A1* | 2/2015 | Earl | G06F 17/30144 707/625 |
| 2015/0089180 A1* | 3/2015 | Yamamura | G06F 12/023 717/170 |
| 2015/0304337 A1* | 10/2015 | Nguyen-Tuong | G06F 21/51 726/1 |
| 2016/0028544 A1* | 1/2016 | Hyde | H04L 9/0869 380/44 |
| 2016/0140363 A1 | 5/2016 | Chiricescu et al. | |
| 2016/0359955 A1* | 12/2016 | Gill | G06F 9/45558 |
| 2017/0149843 A1* | 5/2017 | Amulothu | G06F 9/45558 |
| 2018/0060050 A1* | 3/2018 | Christopher | G06F 8/52 |

OTHER PUBLICATIONS

Fahey et al., "Benefits of Deploying Inherently Secure Nodes Within a Distributed System", Burlington, MA, 6 Pages.

* cited by examiner

[001] typedef int (*Operation)(int a, int b);
[002] typedef struct _test_struct {
[003] int val_int;
[004] int val_buf[8];
[005] Operation myOp;
[006] } test_struct;
[007] int add (int a, int b){
[008] return (a+b);
[009] }
[0010] int mult (int a, int b){
[0011] return (a*b);
[0012] }
[0013] int main (int argc, char *argv[]){
[0014] test_struct my_test_array [2];
[0015] test_struct* ptr = my_test_array;
[0016] int i, sum;

[0017] ptr->myOp = add; // compiler adjusts the tag on the ptr to match the tag on myOp
[0018] (ptr + 1)->myOp = mult; // compiler adjusts the tag on the ptr to match the tag on myOp
[0019] sum = ptr->myOpt(1,2)
[0020] printf("Address/value of 1st myOp = %x/%x\n", &(ptr->myOp), ptr->myOp);
[0021] int * ptr1 = &(ptr-> val_buf [0]); // compiler adjusts the tag on the ptr1 to match the tag on val_buf
[0022] for (i=0; i < 10; i++){
[0023] *ptr1++ = i; // ← during the last two iterations, the tags on ptr1 do not match the tag on myOp (this is the next field in the test_struct) ; thus, an exception is raised.
[0024] }
[0025] printf("Address/value of 1st myOp = %x/%x\n", &(ptr->myOp), ptr->myOp);
[0026] // sum = ptr->myOpt(1,2) ← ERROR: myOpt field had been overwritten
[0027] }

FIG. 1A

PREVIOUSLY PROPOSED TECHNIQUE – tag all the fields of the structure with the same color;

[0028] typedef int (*Operation)(int a, int b);

[0029] typedef struct _test_struct {

[0030] int val_int;

[0031] int val_buf [8];

[0032] Operation myOp;

[0033] } test_struct;

[0034] int add (int a, int b){

[0035] return (a+b);

[0036] }

[0037] int mult (int a, int b){

[0038] return (a*b);

[0039] }

[0040] int main (int argc, char *argv[]){

[0041] test_struct my_test_array [2];

[0042] test_struct *ptr = my_test_array;

[0043] int i, sum;

[0044] ptr -> myOp = add; // does the tag on the ptr match the tag on the myOp field?

[0045] (ptr + 1) -> myOp = mult; // does the tag on the ptr match the tag on the myOp field?

[0046] sum = ptr->myOpt(1,2)

[0047] printf("Address/value of 1st myOp = %x/%x\n", &(ptr->myOp), ptr->myOp);

[0048] int *ptr1 = &(ptr-> val_buf [0]);

[0049] for (i=0; i < 10; i++){

[0050] *ptr1++ = i; // ← the myOp field will be overwritten during the last two iterations, but the tags on ptr1 match the tag on myOp

[0051] }

[0052] printf("Address/value of 1st myOp = %x/%x\n", &(ptr->myOp), ptr->myOp);

[0053] // sum = ptr->myOpt(1,2) ← ERROR: myOpt field had been overwritten

MEMORY PROTECTION USING A TAGGED ARCHITECTURE

CROSS REFERENCE TO RELATED APPLICATIONS

This Application claims the benefit of U.S. Provisional Application No. 62/221,287, filed Sep. 21, 2015, the contents of which are incorporated by reference herein in their entirety.

FIELD OF THE DISCLOSURE

The present disclosure relates to computer memory protection and more particularly to memory protection system using a tagged architecture.

BACKGROUND OF THE DISCLOSURE

The "Heartbleed" bug, is one of many serious vulnerabilities in OpenSSL, a cryptographic software library. These bugs allow information protected by some versions of SSL/TLS encryption to be stolen. SSL/TLS provides communication security and privacy over the Internet for applications such as web, email, instant messaging and some virtual private networks (VPNs). The hugs allow anyone on the Internet to read memory sections of the systems protected by the vulnerable versions of the OpenSSL software. This flaw allows potential access to secret keys used to identify the service providers and to encrypt the traffic, the names and passwords of the users, and the actual content. It allows attackers to eavesdrop on communications, steal data directly from the services and users, and to impersonate services and users. One aspect of the memory protection system of the present disclosure is to stop the vulnerability caused by these vulnerabilities.

SUMMARY OF THE DISCLOSURE

One aspect of the present disclosure provides memory protection using a tagged architecture that enforces the memory protection in hardware at the granularity of the instruction set architecture (ISA) instructions.

One aspect of the present disclosure is a method of computer memory protection using tagged architecture comprising, indicating freed memory by tagging it with an uninitialized tag; providing a unique tag for each field of a structure in a memory array; initializing a tag on a pointer with an initial value; providing a matching tag for each pointer used to point to each field of a structure in the memory array; and preventing unauthorized access beyond a field in a structure by comparing the unique tag on each field of a structure to the tag of the pointer that is used to access the field.

One embodiment of the method of computer memory protection using tagged architecture is wherein initializing the tag on a pointer is handled by a compiler. One embodiment of the method of computer memory protection using tagged architecture is wherein initializing the tag on a pointer is handled by a memory allocation library. One embodiment of the method of computer memory protection using tagged architecture is wherein tag values are assigned by hardware that is not accessible by the user.

One embodiment of the method of computer memory protection using tagged architecture further comprises propagating via hardware tag information according to a memory protection policy.

Another aspect of the present disclosure is a computer-implemented method on a non-transitory medium for metadata processing, comprising executing on a processor the steps of: indicating freed memory by tagging it with an uninitialized tag; providing a unique to for each field of a structure in a memory array; initializing the tag on a pointer with an initial value; providing a matching tag for each pointer used to point to each field of a structure in the memory array; and preventing unauthorized access beyond a field in a structure by comparing the unique tag on each field of a structure to the tag of that field's pointer.

One embodiment of the computer-implemented method is wherein initializing the tag on a pointer is handled by a compiler. One embodiment of the computer-implemented method is wherein initializing the tag on a pointer is handled by a memory allocation library. One embodiment of the computer-implemented method is wherein tag values are assigned by hardware that is not accessible by the user.

One embodiment of the computer-implemented method further comprises propagating via hardware tag information according to a memory protection policy.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A shows one embodiment of the system of the current disclosure.

FIG. 1B shows previously proposed memory protection schemes that rely on tags.

DETAILED DESCRIPTION OF THE DISCLOSURE

Current computer memory protection schemes rely mostly on software to check and enforce the bounds of memory accesses. Such schemes incur high overhead and thus are not widely deployed. Some schemes (e.g. INTEL's MPX) rely on extra registers that keep the base and bounds of the allocated memory. Other schemes that are enforced by hardware rely on tags—metadata that provides information about the computer word that it is associated with. Previous computer memory protection schemes employed tags with the same tag (e.g. color) on all of the elements within a chunk of allocated memory. There, when a memory access occurs, the tag on the pointer through which the data is accessed is checked against the tag on the data itself. If the two tags match, the memory access is allowed to proceed, otherwise, an exception is raised and the system faults to a handler.

One aspect of the present disclosure provides memory protection using a tagged architecture that enforces the memory protection at the hardware level and at the granularity of the instruction level. It is understood that in computing there are instructions (or complied code) that allow the CPU to operate. Theses instructions are governed at a higher level by policies. One example would be a security policy that enforces some invariant (e.g. temporal and spatial memory safety). One policy might be that if once a portion of memory has been allocated, then access to that memory should not extend out of bounds of the memory allocation or there could be unknown and adverse effects. A policy will utilize rules. These rules are often grouped by instruction types. During each instruction, the policy that is to be enforced is checked in parallel with the "normal" execution. If the policy is violated, then the instruction will not be allowed and an exception is raised. It is up to the policy programmer to indicate what happens during a particular exception—for example, the program might be halted all together, or a safe value might be stored instead. Additionally, the user does not have access to the tags—they are automatically initialized and updated based on the rules that make up the policy.

It has been recognized (e.g., see FIGS. 1A and 1B) that there is also a need for a computer memory protection system that can disambiguate references within a structure and thus prevent unauthorized accesses beyond the boundaries of the fields of the structure. For example, accessing the fields of the test_structure (FIG. 1A, lines 3-5) through a pointer should be able to differentiate between the buf field and the myOp field. Otherwise, programming errors similar to the one described on line 50 of FIG. 1B would overwrite the myOp field when attempting to (incorrectly) update only the buf field. In other words, the exemplary test structure (test_struct) in FIG. 1A and FIG. 1B has three fields: the first is an integer value (val_int), the second is an array (val_buf), and the third is a function (myOp). According to the principles of the present disclosure, the compiler might label each of the fields in the test_struct in FIG. 1A red, but will give each of the three fields a different color red. Later, for example, in line 15 of FIG. 1A, when the pointer (ptr) attempts to point to the test array, it needs to match the particular field.

In certain embodiments of the system of the present disclosure, tagged sub fields are used to differentiate between different parts of a memory chunk. Most of the time, allocated memory contains heterogeneous fields (e.g., a C array of structures, with each structure containing multiple fields of different types) that would be tagged pseudo-uniformly (e.g., red). In certain embodiments, when a memory allocation contains homogeneous elements, each element may be tagged with the same "tag/color." However, if there are non-homogeneous types, the lower bits of the tag can be used to differentiate between the different types of elements that are allocated. In simple terms, instead of using a single color "c" to tag all the elements of the structure, derivative colors (c1, c2, etc.) can be used. In certain embodiments, the rules can be modified to account for "non-perfect" matching of pointers and data. One example is the shades of red situation noted above. In certain embodiments, the non-perfect match will use a mask before comparing the tag on the pointer and the tag on the data. A mask can be used to enable comparison of only the most significant bits of the color (e.g. line 46 of FIG. 1B), where the system ignores the least significant 2 bits of the color of the pointer ptr when doing the comparison with the color on the myOpt field). In other words, the ptr would be set to red, but not the particular red of the field within the structure. In certain embodiments, freed memory will be set at an "uninitialized" color.

Existing memory protection solutions use the same tag on all the elements of the allocated memory. The same tag/color is used for all the elements of the foo structure when the program allocates memory for the foo structure. Then, when the structure is accessed through a pointer, the tag on the pointer is checked against the tag on the field and an exception is raised if the two do not match. Such a scheme would not detect access beyond the boundary of the buf_char field member, which could potentially either read/write from/to the buf_float and/or ptr_int fields creating a potentially serious violation. This could potentially allow an attacker to take control of a program and potentially of the machine. It is a basic buffer-overflow attack that enables all sorts of attacks. Buffer overflow attacks were the most prevalent attacks in 2015.

In certain embodiments of the present disclosure, the foo structure can be disambiguated and accesses beyond the boundaries of the sub-fields of the structure can be prevented. This can be done by creating different colors for the struct fields and relying on the compiler to tag (with a special "color") the operations that adjust the colors of the pointer that is accessing the struct fields. Operations tagged with that special tag (mostly pointer adjustment operations) would use the value of the "adjustment" to generate a correct color for the pointer (e.g., the particular red).

For legacy applications, existing memory protection schemes using tagged architectures are incapable of detecting accesses beyond the boundaries of individual fields of the structure. In contrast, one embodiment of the present disclosure addresses this problem for "static accesses" (e.g., accesses all subfields of the structure explicitly instead of using pointer arithmetic to get to a specific subfield). In one embodiment of the present disclosure, the compiler might use pointer arithmetic to get to a specific field, but it will also insert an instruction to change the color of the resulting pointer to a value that is indicated into a register. Since the access to structure fields is done explicitly, the compiler knows the color of the subfield and can adjust the color of the pointer (see FIG. 1A). This will ensure that accesses beyond the boundaries of any sub-field are not allowed. In cases where the access to structure subfields are not "static" (as per the definition above) one can fall back to memory protection micro-policies that have been proposed in the past. In certain embodiments, the present disclosure may be also used for fine grain memory protection of code that is recompiled.

In certain embodiments, a security enforcement unit (SEU) protection policy for memory safety pertaining to Allocation/Free is used. In certain embodiments, each new allocation creates a fresh tag c (a "color"). In certain embodiments, the tag for each memory location in the allocation block is set to c and the tag of the pointer to the new allocation is initialized to c. When a memory block is freed, the tags on all of its cells are changed to a constant, <uninitialized>. Then, the compiler can set the tags/colors appropriately or link against malloc- and free-SEU aware libraries. Linking against the malloc- and free-SEU aware libraries will guarantee that the tags on the allocated/freed memory are set up appropriately.

Current memory protection systems may use the general structure of the rule:

Opgroup: $(PC_{tag}, Cl_{tag}, OP^1_{tag}, OP^2_{tag}, MR_{tag})$->$(PC'_{tag}, R'_{tag})$ if guard?

Where "guard?" represents an expression that evaluates to TRUE if the instruction is allowed to proceed, and to FALSE if the instruction is not allowed to proceed/execute and an exception is generated. The "guard?" expression is evaluated in parallel with the tag calculation. Examples of "guard?" expressions may include: PCtag>OP1tag && PCtag>OP2tag, and the like.

Security enforcement unit (SEU) protection policies for memory safety that pertain to Storing Pointers may have every word in memory contain two tags (e.g., c, t) where: c is the id (color) of the memory block in which the cell was allocated; and t is the tag on the word stored in the cell. There, the rules for load/store take care of packing/unpacking, of these pairs.

In certain embodiments, security enforcement unit (SEU) protection policies for memory safety that pertain to Read/Write may have data transfer that is allowed only if the source is of a uniform color (e.g., a result of a single allocation). In certain embodiments, the system de-references a pointer to check that the tag of the pointer matches the tag of the memory cell, otherwise the operation is not allowed. There, a NAV and security trap is invoked. What the trap does next is up to the system/policy designer. In some instances, the trap can return a "safe" value, it can stop the thread, or take any action deemed safe by the policy designer. In certain embodiments of the present disclosure, some structure allocation rules include legacy code, where all fields have the same (unique) color, and new code, where each field has a distinct (unique) color. It is important to note that a legacy policy minimizes the cost of porting the application to a SEU with minimal additional risk over stricter new code policy.

In certain embodiments, the legacy policy for Read: load: (-, -, c1, -, (c2, t2))→(-, t2) if c1=c2; (load memory into register) and the tag is set on the result (e.g. the destination register) to t2 if the color id on the pointer (c1) is the same as the color id (c2) of the location referenced by the pointer. In certain embodiments, for Write: store: (-, -, t1, c2, (c3, t3))→(-, (c3, t1)) if c2=c3 (store register to memory) and the tag is set on the result (e.g. the memory location) to t1 if the color id of the memory block where the data will be stored (c3) is the same as the color id of the pointer (c2). In certain embodiments, a legacy policy is needed to support typical network packet hacking idioms.

An SEU could allow the copy (into the bp buffer) of more than the "size" of *p1; however, the amount being copied would be to the end of the SSL buffer. In certain embodiments, the attacker would not be able to get the arbitrary size data from the current process; this is due to the fact that the SSL buffer is a structure that is accessed though a single pointer (so the entire structure is colored with a single color). In certain embodiments of the present disclosure, an SEU-aware compiler would color each component of the structure with a different color and the access to each component of the structure would be through different pointers.

In one example of a legacy policy, some important data structures include:

```
struct ssl3_record_st
{
unsigned int length; /* How many bytes available */
[ ... ]
unsigned char *data /* pointer to the record data */
[ ... ]
} SSL3_RECORD;
and
struct {
HeartbeatMessageType type; // 1 byte
uint16 payload_length; // 2 bytes
payload[HeartbeatMessage.payload_length]; // length
padding[padding_length]; // padding
} HeartbeatMessage;
```

There are additional SEU benefits and they include, but are not limited to, security policy properties that are enforced (in hardware) from a single location; resiliency to bugs in the program; and elimination of whole classes of errors (NOT a "patch and pray" approach). Enforcing from a single location, as opposed to being distributed in multiple places in the code, is also a major benefit because distributing in the code makes it subject to errors of omission.

Security enforcement unit (SEU) protection policies include application specific coloring schemes (e.g., TS, S, C). One such scheme might be TS=top secret, S=secret, and C=common or non-secret. In certain embodiments, the system detects when untrusted data may flow into sensitive operations. In certain embodiments, this process can be fine-grained with unlimited number of sources. In certain embodiments, a separate scheme/source may be used. In certain embodiments, multiple schemes per data may be used. In some embodiments of the system of the present disclosure, each tag is a pointer to a set of unique IDs, where the value is the union of the application specific coloring schemes on the values used to compute it. In some cases, sensitive operations can he restricted to an upper level. For example:

add: $(-, c_i, op1, op2, -) \rightarrow (-, c_i \cup op1 \cup op2)$ load: $(-, c_i, op1, -, mr) \rightarrow (-, c_i \cup op1 \cup mr)$ store: $(-, c_i, op1, op2, -) \rightarrow (-, c_i \cup op1 \cup op2)$ $$\text{load: } (-, -, c_1, -, (c_2, t_2)) \rightarrow (-, t_2) \text{ if } c_1 = c_2 \qquad (8)$$

$$\text{store: } (-, c_i, t_1, c_2, (c_3, t_3)) \rightarrow (-, (c_3, t_1)) \text{ if } c_2 = c_3 \wedge c_i \notin \{t_{mallocinit}, t_{freeinit}\} \qquad (9)$$

$$\text{store: } (-, t_{mallocinit}, t_1, c_2, F) \rightarrow (-, c_2, t_1)) \qquad (10)$$

$$\text{store: } (-, t_{freeinit}, t_1, c_2, (c_3, t_4)) \rightarrow (-, F) \qquad (11)$$

In legacy systems, (10) and (11) are used for malloc/free. For malloc, a fresh tag is generated for the pointer to the new region via an ephemeral rule; then the newly tagged pointer is used to write zero to every word in the allocation region using a special store rule (10) before returning the tagged pointer. Rule (11) is used to retag the region as unalloacted/free before returning the memory region to the free list, It is understood that tagged architectures have been shown to be effective (e.g. very low overhead) at enforcing a wide range of security-related policies. Generally, a memory safety policy relies on comparing the tag of the memory location and the tag of the pointer through which the location is accessed. If the two tags do not match, an exception is raised and the control is transferred to a handler. If there is a match, the instruction proceeds and the tags on the result (and PC) are updated (Applicant's own work).

Previous proposed memory safety policies allocated the same tag to all the elements of a chunk of memory, regardless of the type of data that was stored. For example, when one allocated an array of integers, all the memory locations where the integers were to be stored were tagged with the same tag (i.e. "color") as the pointer that was returned by the allocator. A series of micro-policies was then defined which ensured spatial and temporal memory safety (Applicant's own work).

Referring to FIG. 1A and FIG. 1B, the previous scheme worked well in the case in where the memory was homogeneous. If the allocated memory is non-homogeneous (as in the ease when C structs contains fields of different types—e.g., see lines [002]-[006] in FIG. 1A), the previously proposed policies are able to be bypassed and certain memory corruptions are still possible. The previously proposed memory safety policies use the same tag (or color) to mark the entire memory; this is the case exemplified on lines [0029]-[0033] and [0041]-[0042] of FIG. 1B. There, all the members of the test_struct are tagged with the same value as the tag on the pointer through which the struct was accessed (e.g., ptr). However, a poorly or maliciously written code (as shown in lines [0049]-[0051] of FIG. 1B) could overwrite a member of the test struct (e.g. the myOp function pointer) with potentially devastating effects. The previously proposed memory safety schemes do not allow access to anything beyond the allocated memory (e.g. one cannot access, through the ptr pointer memory outside the my_test_array). The previously proposed memory protection scheme and the tagging that would be done for the my_test_array and the pointers that are used to access that array is shown on lines [0028]-[0054] of FIG. 1B.

In one embodiment of the system of the present disclosure a different tag for each member of the test_struct structure is used. The tagging of my_test_array and that of the pointers through which the array is accessed is shown on lines [001]-[0027] of FIG. 1A. Note that this solution is possible because the code uses "explicit" reference of the elements of the data structure. For example, according to the principals of the present disclosure, adding arbitrary offsets to a base address to access certain fields of a struct is not allowed. Because the access is done explicitly, the compiler knows which field is accessed and can insert instructions to change the color of the pointer through which the struct is accessed. In certain embodiments, such an instruction is considered privileged and will be tagged with a special tag. In certain embodiments, this ensures that the instruction is not accessible by users.

As discussed previously, the "one color for all" scheme works well if all the elements of the allocated array are homogeneous (e.g., all elements are integers); however, when the elements are not homogeneous (e.g. an array of structs, with the elements of the struct being of different types) the previous scheme does not provide protection against overwriting individual elements of the struct as all the elements of a struct are tagged the same way. Take for example, the program from FIG. 1B: when the my_test_array is created, all the elements of the array (including all the fields of the test_struct) are tagged with the same pointer (e.g. color). When executing line [0050] of FIG. 1B the tag on the ptr pointer matches the tag on the data being referenced (since the tag on val_buf had been initialized to the same value as all the elements of the my_test_array). As a result, the last two iterations of the loop will successfully overwrite the myOp function pointer member of the first element of the my_test_array. However, if the iteration count of the for loop on line [0049] of FIG. 1B is large enough, the previously proposed schemes would eventually raise an exception and one would not be able to write beyond the content of the my_test_array.

The disclosure and all of the functional operations described herein can be implemented in digital electronic circuitry, or in computer hardware, firmware, software, or in combinations of them. The disclosure can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the disclosure can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array), an ASIC (application-specific integrated circuit), or the like.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of computer memory protection using tagged architecture, the method comprising,
    indicating freed memory in a memory array, via a hardware circuitry, by tagging the freed memory with an uninitialized tag;

initializing, via the hardware circuitry, the uninitialized tag on a pointer with an initial value to form an initialized tag;

providing, via the hardware circuitry, a unique tag for each of two or more fields of a structure stored in the memory array, wherein the two or more fields of the structure are of different data types;

providing, via the hardware circuitry, a matching tag for each pointer used to point to any of the two or more fields of the structure stored in the memory array;

preventing unauthorized access beyond each of the two or more fields of the structure by comparing, via the hardware circuitry, the unique tag on the two or more fields of the structure with the matched tag of the pointer that is used to point to the two or more fields of the structure, wherein all tag values are assigned only by the hardware circuitry and are not accessible by any user processes; and propagating tag information via the hardware circuitry according to a memory protection policy.

2. The method of computer memory protection using tagged architecture of claim 1, wherein initializing the tag on a pointer is handled by a compiler.

3. The method of computer memory protection using tagged architecture of claim 1, wherein initializing the tag on a pointer is handled by a memory allocation library.

4. A computer-implemented method on a non-transitory medium for metadata processing, comprising executing on a processor the steps of:

indicating freed memory in a memory array, via a hardware circuitry, by tagging the freed memory with an uninitialized tag;

initializing, via the hardware circuitry, the uninitialized tag in a pointer with an initial value, to form an initialized tag;

providing, via the hardware circuitry, a unique tag for each of the two or more fields of a structure stored in the memory array, wherein the two or more fields of the structure are of different data types;

providing, via the hardware circuitry, a matching tag for each pointer used to point to the two or more fields of the structure stored in the memory array;

preventing unauthorized access beyond the two or more fields of the structure by comparing, via the hardware circuitry, the unique tag on each of the two or more fields of the structure with the matched tag of the respective field's pointer, wherein all tag values are assigned only by the hardware circuitry and are not accessible by any user processes; and propagating tag information via the hardware circuitry according to a memory protection policy.

5. The computer-implemented method of claim 4, wherein initializing the tag on a pointer is handled by a compiler.

6. The computer-implemented method of claim 4, wherein initializing the tag on a pointer is handled by a memory allocation library.

7. A method of computer memory protection using tagged architecture, the method comprising, providing, via a hardware circuitry, a unique tag for each of two or more fields of a structure stored in the memory array, wherein the two or more fields of the structure are of different data types;

initializing, via the hardware circuitry, a tag on a pointer with an initial value, to form an initialized tag;

providing, via the hardware circuitry, a matching tag for each pointer used to point to the two or more fields of the structure stored in the memory array;

comparing, via the hardware circuitry, the unique tag of each field of the structure with the matched tag of the pointer that is used to point to each field of the structure;

preventing, via the hardware circuitry, unauthorized access beyond each of the two or more fields of the structure when the unique tag on the two or more fields of the structure does not match the matched tag of the pointer that is used to point to the two or more fields of the structure, wherein all tag values are assigned only by the hardware circuitry and are not accessible by any user processes: and propagating tag information via the hardware circuitry according to a memory protection policy.

8. The method of computer memory protection using tagged architecture of claim 7, further comprising indicating, via the hardware circuitry, freed memory in a memory array by tagging the freed memory with an uninitialized tag.

9. The method of computer memory protection using tagged architecture of claim 7, wherein initializing the tag on a pointer is handled by a compiler.

10. The method of computer memory protection using tagged architecture of claim 7, wherein initializing the tag on a pointer is handled by a memory allocation library.

* * * * *